United States Patent [19]

Ishizuka et al.

[11] 4,087,890
[45] May 9, 1978

[54] COMPOUND LATHE

[75] Inventors: Shinichi Ishizuka; Kenji Sugimoto, both of Tokyo, Japan

[73] Assignee: Citizen Watch Company Limited, Tokyo, Japan

[21] Appl. No.: 592,967

[22] Filed: Jul. 3, 1975

[30] Foreign Application Priority Data

Sep. 10, 1974 Japan .............................. 49-103438
Sep. 10, 1974 Japan .............................. 49-103440
Oct. 25, 1974 Japan .............................. 49-122394

[51] Int. Cl.² ................... B23B 7/06; B23B 11/00; B23B 13/02
[52] U.S. Cl. ............................ 29/27 C; 29/37 A; 29/40; 82/38 R; 408/35
[58] Field of Search ............... 29/27 C, 568, 37 A, 29/40, 47; 82/2.5, 2.7, 38 R; 408/35; 279/1 L

[56] References Cited

U.S. PATENT DOCUMENTS

| 1,479,550 | 1/1924 | Kristek | 82/2.5 X |
| 2,227,620 | 1/1941 | Armitage et al. | 279/1 E X |
| 2,395,365 | 2/1946 | Wilson et al. | 82/38 R X |
| 2,682,698 | 7/1959 | Berthicz | 408/35 X |
| 2,775,026 | 12/1956 | Schrader | 82/2.5 X |
| 3,477,121 | 11/1969 | Martin | 29/568 |
| 3,717,417 | 2/1973 | Aubrier | 408/35 |
| 3,926,078 | 12/1975 | Ishizuka et al. | 82/2.5 |

FOREIGN PATENT DOCUMENTS

932,451 7/1963 United Kingdom ............... 29/37 A

Primary Examiner—Z. R. Bilinsky
Attorney, Agent, or Firm—Frank J. Jordan

[57] ABSTRACT

A compound lathe in which a headstock is horizontally movable along a spindle axis to provide longitudinal feeding of a workpiece mounted for rotation with the spindle and a saddle carrying a turret is vertically movable to provide transverse feeding. The saddle is slidably disposed on vertical guideways which is formed on a column mounted on a bed at the back of the headstock rearwardly of cutting areas of the workpiece and which vertically extends in a plane parallel to the axis of the spindle. The turret supports tools for turning, milling, drilling and other operations. Numerically controlled servo motors preferably position the headstock and saddle. A secondary workpiece gripping means is provided to grip the end of the workpiece opposite the headstock and is releasably connected to the headstock for movement therewith. The gripping means allows accurate secondary machining of the cut-off portion of a parted workpiece by the tools on the turret.

17 Claims, 9 Drawing Figures

COMPOUND LATHE

This invention relates in general to compound lathes and, more particularly, to a numerically controlled compound lathe of the type having a horizontally movable headstock.

As is well known in the art, it has been a common practice to have a compound lathe equipped with attachments to perform secondary cutting operations such as milling, drilling, threading, etc., in addition to principal turning operation. This compound lathe is profitable for reducing set-up times and providing adaptability to multiple-machine operation by a minimum of operators and set-up men, through which factors lower costs per piece are usually realized.

Conventional compound lathes basically comprise a spindle to support a workpiece, a fixed or horizontally movable headstock carrying the spindle, a tool holder which is movable either in directions parallel and perpendicular to the axis of the spindle or in a direction perpendicular to the axis of the spindle, driving motors for driving the spindle and tools on the tool holder, and an indexing device of the spindle for indexing the spindle in one of several operative positions. In known compound lathes with a headstock movable on first guideways in which the tool holder or the turrent is movable on second guideways extending in a direction perpendicular to the axis of the spindle it is easy to treat chips and cutting oil since the chips and cutting oil are produced at substantially fixed areas in each operation. However, in these lathes, the second guideways are usually located on opposing side of the headstock with respect to cutting areas of the workpiece and thus, the discharging efficiency of the chips and cutting oil is considerably reduced.

In general, modern numerically controlled compound lathes are usually controlled in response to various control signals and a main movable part such as the turret is provided with electric control equipments. In addition, the compound lathes have various driving or actuating means such as electric motors and electromagnetic actuators for actuating various movable parts, and a lot of leads connected to these electrical equipments are disposed along the structural parts of the lathes. In the compound lathes in which the second guideways for the turret are provided on the same side as the cutting areas of the workpiece, the electrical equipments must be necessarily located near the travelling paths of the chips and cutting oil resulting in deterioration of the operating stability and reliability.

It has heretofore been proposed to provide a numerically controlled automatic lathe in which a headstock is fixed and a turret is movable parallel and perpendicular to the axis of the headstock spindle. Longitudinal feed of the turret is performed by a turret indexing shaft which is slidably disposed in a saddle, and transverse feed of the turret is performed by the saddle. The saddle is slidably disposed on horizontal guideways provided at the back of the headstock rearwardly of cutting areas of the workpiece. With this arrangement, the lathe does not have any structural parts in cutting areas of the workpiece and, therefore, the ejecting efficiency of the chips and cutting oil is satisfactorily increased. Since, however, the turret is arranged to be movable in two directions, viz., parallel and perpendicular to the axis of the headstock spindle, a difficulty is encountered in driving the tool spindles in a simplified manner and, hence, the secondary machining can not performed. Another drawback inherent in this automatic lathe is that the working efficiency of the operator is relatively poor because the guideways for the saddle carrying the turret extend in a horizontal plane at the back of the headstock and great distance exists between the operator and the turret.

Another problem inherent in the conventional compound lathes resides in the provision of driving means for driving the headstock spindle and tool spindles. It is desired that a single source of driving power be provided for driving both of the headstock spindle and tool spindles with a view to providing a compact construction as well as reducing manufacturing cost and maintenance fees. To this end, the compound lathes should have a drive train arranged to transmit driving power from a single source of driving power to both of the headstock spindle and tool spindles. In first type of known compound lathes with a fixed headstock in which the turret is movable in two directions, it is easy to transmit the driving power to the headstock spindle. However, a great difficulty is encountered in transmitting the driving power to the tool spindles because a complex drive train having a greater flexibility is required to permit bidirectional movements of the turret. In second type of compound lathes with a horizontally movable headstock and a unidirectionally movable turret provided on opposing side of the headstock, a drive train for the headstock spindle and tool spindles is more simplified in arrangement than that of the compound lathes in which the turret is movable in two directions. However, attempts to provide a common source of driving power for driving both of the headstock spindle and tool spindles have not heretofore been made in the second type of compound lathes due to their inherent construction and arrangement in which the headstock and turret is spaced from each other with a greater distance.

A further problem resides in the above-mentioned compound lathes in that it is difficult to perform secondary machining of the faces of portions of workpieces which are parted from the main portion of the stock gripped in the collet or chuck of the headstock. To solve this problem, it has heretofore been proposed to provide a second headstock on opposing side of the main headstock. With this proposal, it is necessary to provide a separate drive means, preferably numerically controlled, to additionally feed such a second headstock. This causes an increase in the load of the whole numerical control systems of the lathes, and the numerical control systems become necessarily complex in arrangement thus increasing the manufacturing and maintenance costs. Another proposal made in the prior art is to provide special attachments for performing secondary machining on back or cut-off ends of the workpieces after parting. These attachments include loading mechanisms and additional equipments specifically provided for performing secondary machining on parted workpieces, by which the lathes become more complex in construction.

Among other problems, since the conventional compound lathes have a turret slidable on guideways provided on opposing side of the headstock and longitudinally spaced therefrom with a greater distance, the working area of the operator is greatly spread in longitudinal direction thereby decreasing the maneuverability of machine elements and, further, installation spacing is necessarily increased.

It is, therefore, an object of the present invention to provide a compound lathe which can overcome the shortcomings encountered in prior art compound lathes.

It is another object of the present invention to provide a compound lathe of the slidable headstock type which provides improved maneuverability of machine elements.

It is another object of the present invention to provide a compound lathe of the slidable headstock type which has a simple integrated drive train to transmit a driving power from a single driving power source to a headstock spindle and tool spindle.

It is another object of the present invention to provide a compound lathe of the slidable headstock type in which a headstock, turret and guideways for respective headstock and turret are so arranged as to provide an increased rigidity in construction and provide a compact construction having less installation spacing.

It is another object of the present invention to provide a compound lathe of the slidable headstock type which is suitable for performing machining operations on relatively longer workpieces.

It is still another object of the present invention to provide a compound lathe of the slidable headstock type which is so arranged as to increase the discharging efficiency of chips and cutting oil produced during machining operations and prevent deterioration of electrical equipments to provide higher reliability in operation as well as reducing maintenance time.

It is still another object of the present invention to provide a compound lathe of the slidable headstock type including numerically controlled drive means for feeding a headstock and turret in desired directions on a numerically controlled basis.

It is still another object of the present invention to provide a compound lathe of the slidable headstock type including a workpiece steady rest support serving as a reaction torque receiving member to support a longer workpiece having a larger length to diameter ratio at a point near the cutting areas of the workpiece to perform accurate machinings of the workpiece.

It is a further object of the present invention to provide a numerically controlled compound lathe including a secondary workpiece gripping means provided on opposing side of a headstock to permit secondary machinings of the faces of portions of workpieces.

It is a further object of the present invention to provide a numerically controlled compound lathe having a secondary workpiece gripping means which requires less handling time on secondary machining of parted workpieces.

It is a further object of the present invention to provide a numerically controlled compound lathe having a secondary workpiece gripping means which allows finishing of back or cut-off ends of parted workpieces in an accurate manner.

It is a further object of the present invention to provide a numerically controlled compound lathe having a secondary workpiece gripping means which allows secondary machining of parted workpieces with the use of a minimum number of numerically controlled drive means.

It is a further object of the present invention to provide a numerically controlled compound lathe having a secondary workpiece gripping means which is arranged to be releasably connected to a headstock to be longitudinally movable therewith.

It is a still further object of the present invention to provide a numerically controlled compound lathe having a secondary workpiece gripping means which is arranged to automatically knock a workpiece out of a gripping unit.

It is a still further object of the present invention to provide a numerically controlled compound lathe having a secondary workpiece gripping means which is arranged to clamp a parted workpiece at the same position for each secondary machining.

It is a still further object of the present invention to provide a numerically controlled compound lathe having a secondary workpiece gripping means which is arranged to be fed by a numerically controlled drive means common to a horizontally movable headstock.

The above and other objects, features and advantages of the present invention will become more clear from the following detailed description taken with the accompanying drawings, in which.

Figure 1:
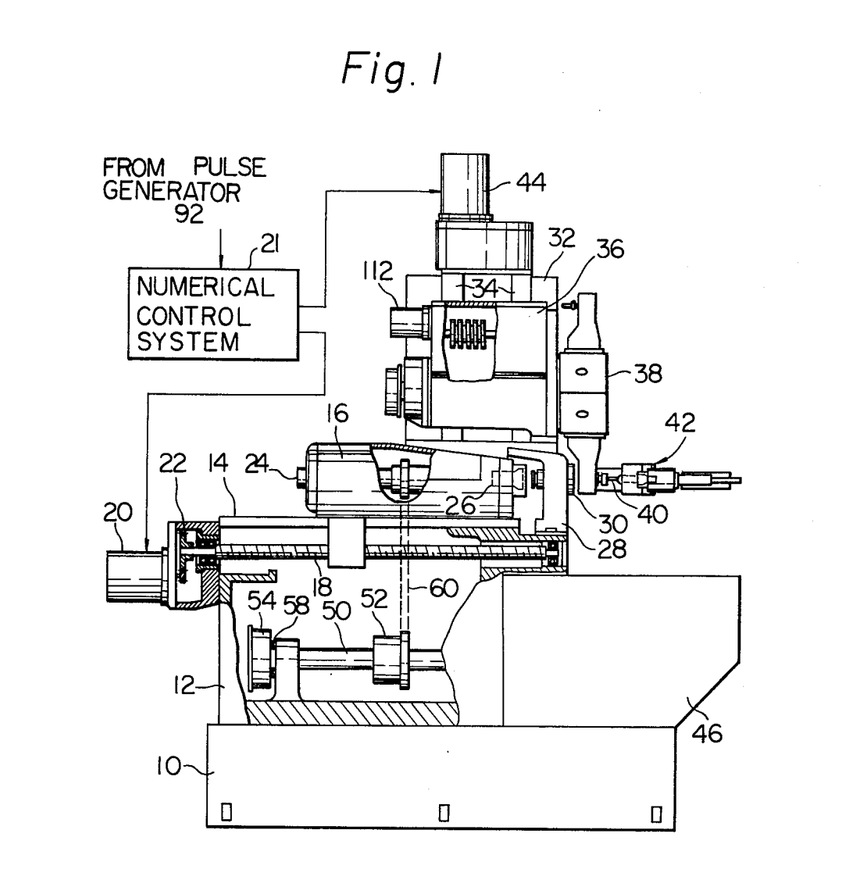
FIG. 1 is a longitudinal plan view of a compound lathe embodying the present invention.

Referring now to FIG. 1, a numerically controlled compound lathe embodying the present invention comprises a stand 10 which supports a bed 12. The bed 12 is provided with horizontal guideways 14 to slidingly support a longitudinally movable headstock 16. Rotation of a lead screw 18 connected to the headstock 16 produces rightward or leftward forward or rearward, movement of the headstock 16 as viewed in FIG. 1. A numerically controlled servo motor 20 is arranged to controllably rotate the lead screw 18 through a reduction gear set 22 in response to a command signal from a numerical control system 21. The numerical control system 21 is well known in the art and, therefore, a detail description of the same is herein omitted for the sake of simplicity of description.

The headstock 16 is provided with a hollow rotary spindle 24 which holds workpiece gripping means shown here as a collet 26. The lathe further comprises a workpiece steady rest support 28 detachably mounted on the bed 12 which is provided with a workpiece engaging member shown as a bushing 30 to support long workpieces, the axis of which is aligned with the axis of the spindle 24. The bushing 30 may be arranged to be rotatable in a manner as will be subsequently described in detail.

Figure 2:
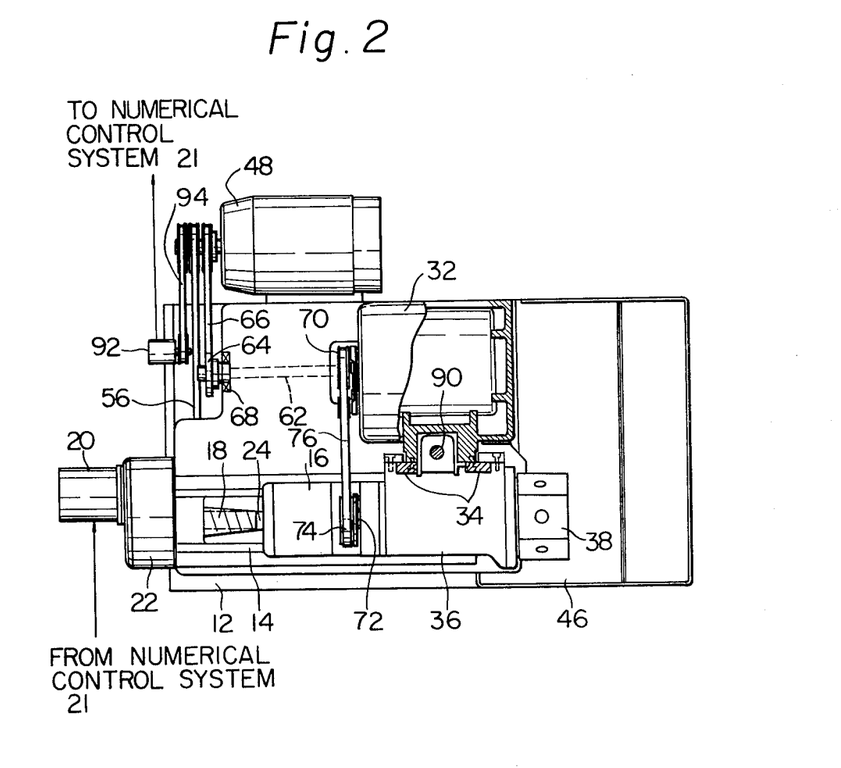
FIG. 2 is a plan view, looking from above, of the lathe shown in FIG. 1.
Figure 3:
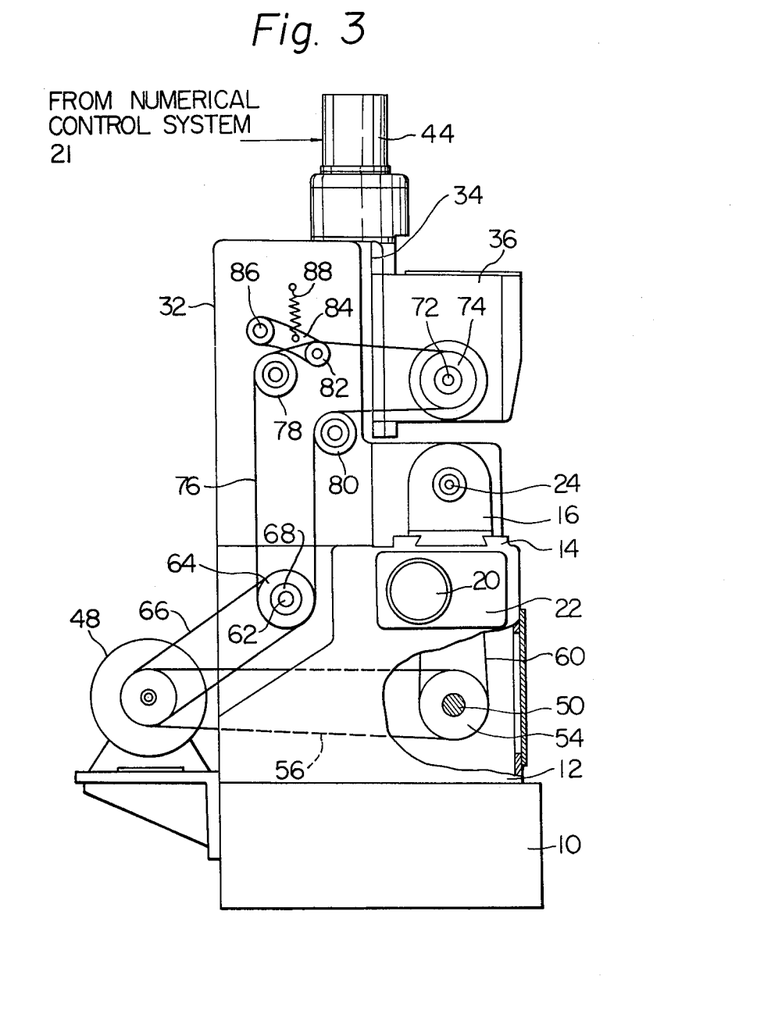
FIG. 3 is a transverse plan view, partly in section, of the lathe shown in FIG. 1.

A vertically extending column 32 is fixed to the bed 12 at the side of the horizontal guideways 14 rearwardly of cutting areas of the workpiece and is provided at its front face with vertical guideways 34 extending in a plane parallel to the axis of the headstock spindle 24 at a position adjacent a forward end portion of the horizontal guideways rearwardly of cutting areas of the workpiece. As best shown in FIGS. 2 and 3, a saddle 36 is vertically aligned with the headstock 16 and slidable on the vertical guideways 34 in the area above the headstock 16. While in the illustrated embodiment, the guideways 34 are shown as being formed on the same plane, it should be noted that the guideways 34 may also be formed on different planes if desired. A turret 38 is rotatably supported by the saddle 36 to hold a plurality of tools so that a selected tool 40 is movable in a vertical path which is perpendicular to and intersects the axis of the spindle 24. A secondary workpiece gripping fixture 42 is also provided which will be described in detail below. A numerically controlled servo motor 44 is mounted on the column 32 and responsive to a command signal from the numerical control system 21 to vertically move the saddle 36. A container 46 is provided to receive chips and oil discharged during machining operations.

Referring also to FIGS. 2 and 3, the lathe is provided with a drive train connected to a driving source such as a drive motor 48. A spline shaft 50 has a pulley 54 connected to one end thereof which is connected by a belt 56 to be rotatably driven by the motor 48. A coupling means such as magnetic or other clutch 58 is provided between the shaft 50 and pulley 54 (see FIG. 1). Another pulley 52, which is connected by a belt 60 to rotatably drive the spindle 24, is splined on the shaft 50 and movable along the axis of the shaft 50 in the same direction as the headstock 16.

Another shaft 62 is provided which carries a pulley 64 connected through endless means such as a belt 66 to the motor 48. A coupling means such as magnetic or similar clutch 68 is provided between the shaft 62 and pulley 64. Another pulley 70 is connected to the shaft 62. The turret 38 is provided with a horizontally extending shaft 75 which is connected through a spline connection 73 to a shaft 72 to which is fixed a pulley 74. Endless means such as a belt 76 is drivingly trained around the pulleys 70 and 74, pulleys 78 and 80 rotatably mounted on the column 32 and a tension pulley 82.

The tension pulley 82 is rotatably mounted on an arm 84 which is pivotally mounted on the column 32 by a pin or shaft 86. A tension spring 88 exerts an upward force on the arm 84 and thereby tensions the belt 76. In this manner, even though the saddle 36, shaft 72 and pulley 74 are vertically moved, the belt 76 provides driving connection between the shaft 62 and 72.

As shown in FIG. 2, the servo motor 44 is arranged to vertically move the saddle 36 by means of a lead screw 90. A pulse generator 92 is connected to the motor 48 by a belt 94 and rotated thereby to produce a signal which is applied to the numerical control system 21. Upon receiving this signal, the numerical control system 21 controls the servo motors 20 and 44 so as to control the feeds of the headstock 16 and the saddle 36 at predetermined rates.

Figure 4:
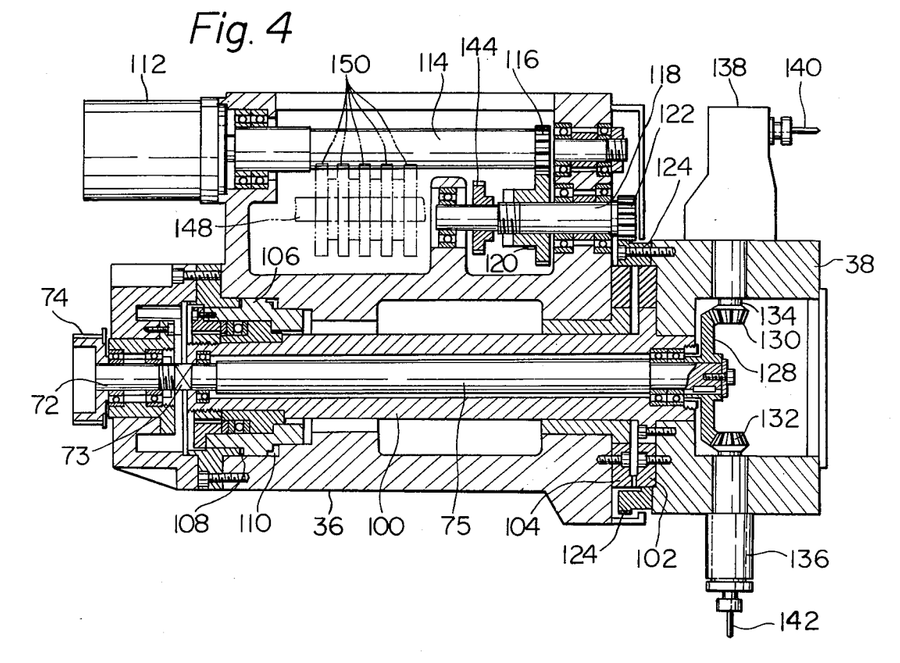
FIG. 4 is a longitudinal sectional view of a saddle and turret of the lathe shown in FIG. 1.

FIG. 4 shows the saddle 36 and turret 38 in cross section. The turret 38 is fixed to the right end of a hollow shaft 100 which is rotatably supported by the saddle 36. The turret 38 is shown as a six position unit for holding six tools for turning, drilling, milling, and other secondary operations. A coupling 102 fixed to the left face of the turret 38 is adapted to engage with a coupling 104 provided on the right face of the saddle 36. The couplings 102 and 104 may comprise dogs (not shown) or similar means to indexingly maintain the turret 38 in one of the six operative positions. A hydraulic piston 106 is connected to the left end of the shaft 100. Pressurized oil introduced into a chamber 108 will act on the left end of the piston 106 to move the piston 106, shaft 100, turret 38 and coupling 102 rightward by an amount sufficient for the coupling 102 to disengage from the coupling 104 and allow rotation of the shaft 100 and turret 38 for indexing. Pressurized oil is normally fed into a chamber 110 to exert a force on the right face of the piston 106 and urge the piston 106, shaft 100, turret 38 and coupling 102 leftward so that the coupling 102 will engage with the coupling 104 in the desired indexing position and the turret 38 will be prevented from rotation.

A motor 112 indexing the turret 38 is mounted on the saddle 36 and has a horizontally extending shaft 114 rotatably supported by the saddle 36 to which is fixed a gear 116. A countershaft 118 is provided with a gear 120 which meshes with the gear 116 and a gear 122 which meshes with a gear 124 fixed to the turret 38 concentrically with the shaft 100. When the motor 112 is energized, the shaft 114 rotates the turret 38 through the gears 116 and 120, shaft 118 and gears 122 and 124 thereby indexing the turret 38.

The shaft 75 rotatably extends through the hollow shaft 100 in parallel to the axis of the spindle 24 and is connected to the shaft 72 through the spline connection 73 in a manner as mentioned hereinabove. A bevel gear 128 is fixed to the right end of the shaft 72 and meshes at right angles with bevel gears 130 and 132.

Six bevel gears are provided which mesh with the bevel gear 128 and, in common practice, one or two bevel gears may be utilized for desired cutting operations other than turning as exemplified by the bevel gears 130 and 132 in FIG. 4. The bevel gears 130 and 132 are fixed to radial shafts 134 and 136 respectively which are rotatably supported by the turret 38. Rotation of the shaft 75 results in rotation of the shafts 134 and 136 through the bevel gears 128, 130 and 132. In the example of FIG. 4, the shaft 134 is not used and a tool grip 138 is rigidly fixed to the turret 38 to rigidly hold a tool 140. The shaft 136, however, is used and a drill 142 is fixed to the bottom thereof for unitary rotation. The saddle 36, turret 38, drill 142 and facing tool 140 are vertically movable by the servo motor 44 and lead screw 90 so that the centers of the drill 142 and tool 140 move in a vertical path which is perpendicular to and intersects the axis of the spindle 24 of the headstock 16.

Figure 5:
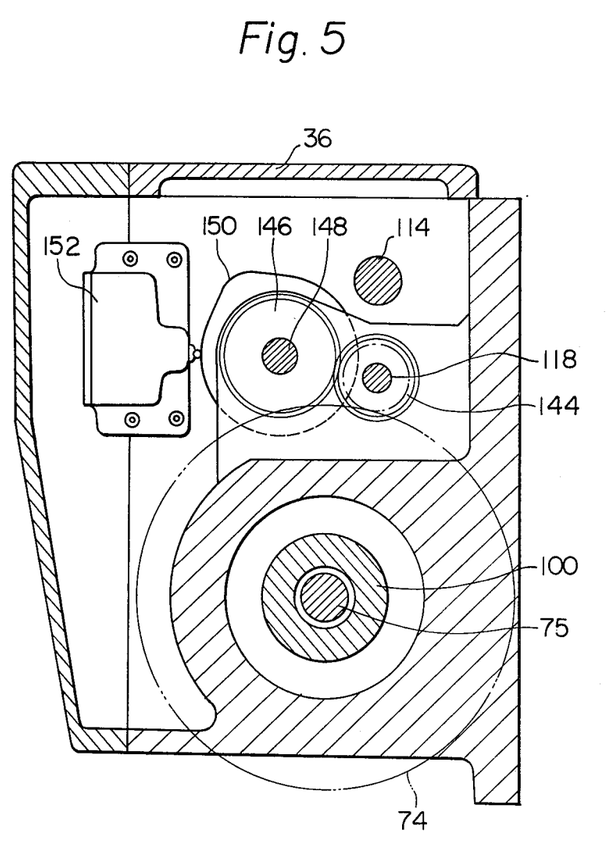
FIG. 5 is a transverse sectional view of the saddle and turret shown in FIG. 4.

Referring also to FIG. 5, another gear 144 is fixed to the shaft 118 which meshes with a gear 146 fixed to a camshaft 148. The camshaft 148 carries six cams (only five are visible in FIG. 4) collectively designated as 150 and corresponding to the six indexing positions of the turret 38. Each cam 150 engages with a limit switch 152 to open or close the same when the turret 38 is in the respective indexing position. The limit switches 152 are connected to an electric control unit (not shown) to control the motor 112 for indexing the turret 38.

Figure 6:
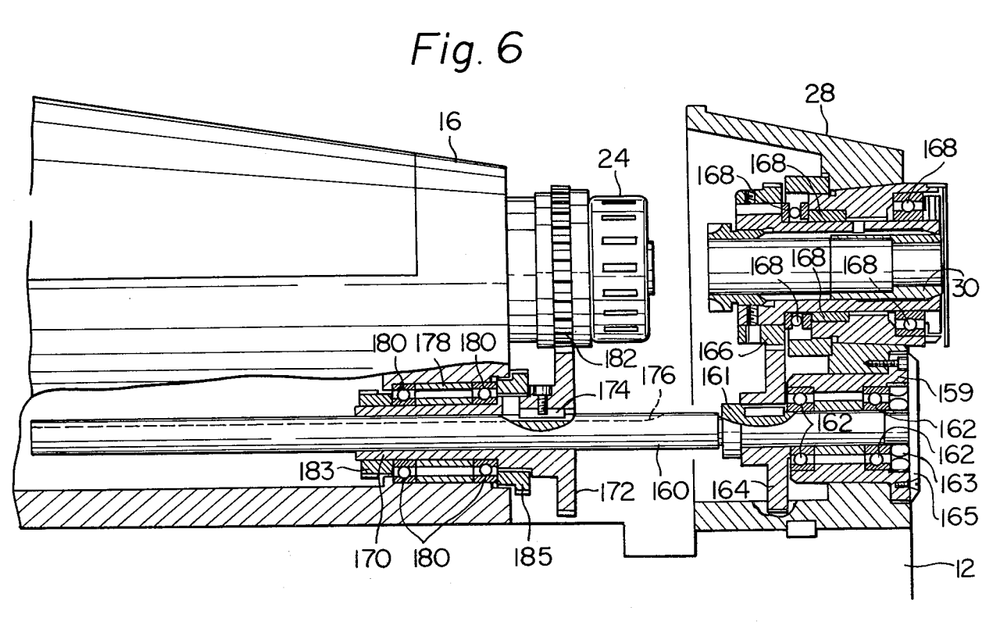
FIG. 6 is a longitudinal plan view, partly in section, of a headstock and workpiece support shown in FIG. 1.

Referring now to FIG. 6, means may be provided to rotate the bushing 30 together with the spindle 24 which comprises a shaft 160 longitudinally extending in parallel to the spindle axis and rotatably supported by bearings 162 disposed in a bushing 159 fixedly supported by the workpiece support 28. Axial movement of the shaft 160 is prevented by a flange 161 formed thereon and a nut 163 screwed onto the right end of the shaft 160. A cover 165 is attached to the right face of the bushing 159 to prevent the entry of the chips and oil thereinto. A gear 164 is fixed to the shaft 160 and meshes with a gear 166 which is rotatable with the bushing 30 in a unitary manner. The bushing 30 is rotatably supported by the workpiece support 28 through bearings 168.

The shaft 160 slidably carries a sleeve 170 integral with a gear 172 which is forced to rotate with the shaft 160 by a key 174 provided to the sleeve 170 and a longitudinal keyway 176 cut in the shaft 160. A bearing housing 178 fixed to the headstock 16 and longitudinally carried therewith supports bearings 180 which rotatably retain the sleeve 170.

The gear 172 meshes with a gear 182 which is rotatable with the spindle 24 in a unitary manner. The gears 182, 172, 164 and 166 provide a gear ratio of unity and cause the bushing 30 to rotate with the spindle 24 at the same speed and in the same direction. In operation, rotation of the spindle 24 rotates the gears 182 and 172. Rotation of the gear 172 and thereby the sleeve 170 rotates the shaft 160 since the sleeve 170 is keyed thereto. The shaft 160 and gear 164 rotate which in turn rotates the gear 166 fixed to the bushing 30 which causes the bushing 30 to rotate. Axial movement of the sleeve 170 is prevented by nuts 183 and 185 so that the gear 172 remains in mesh with the gear 182.

Figure 7:
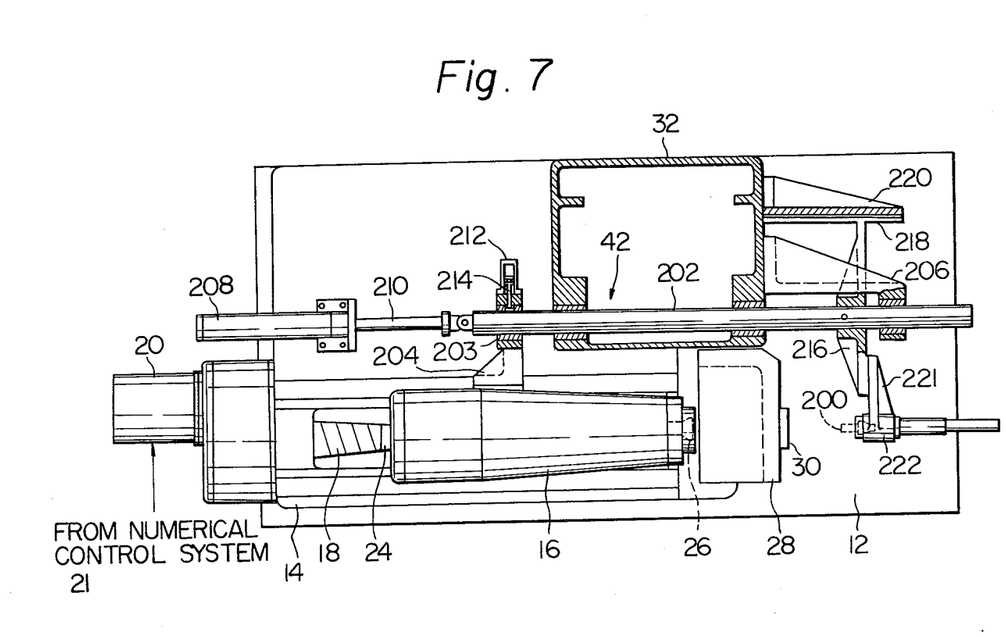
FIG. 7 is a plan view, looking from above and partly in section, of a workpiece gripping fixture which is partially visible in FIG. 1.
Figure 8:
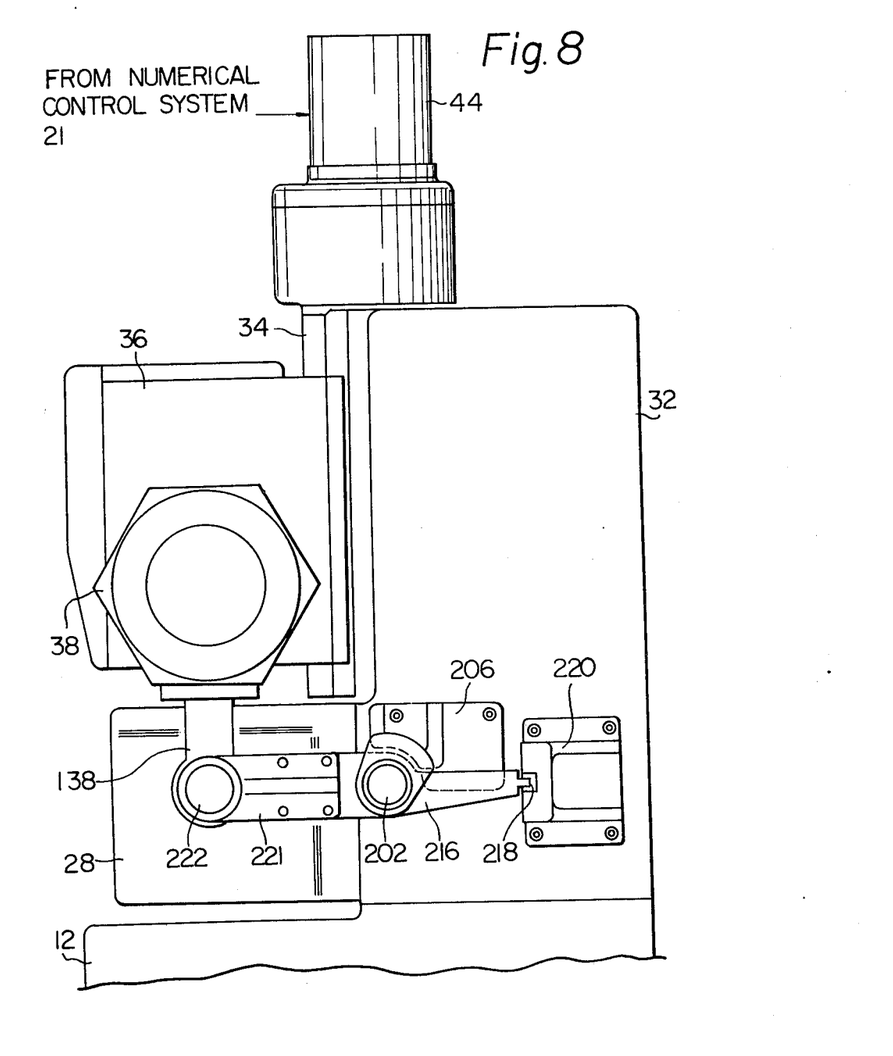
FIG. 8 is an end view of the workpiece gripping fixture shown in FIG. 7.
Figure 9:
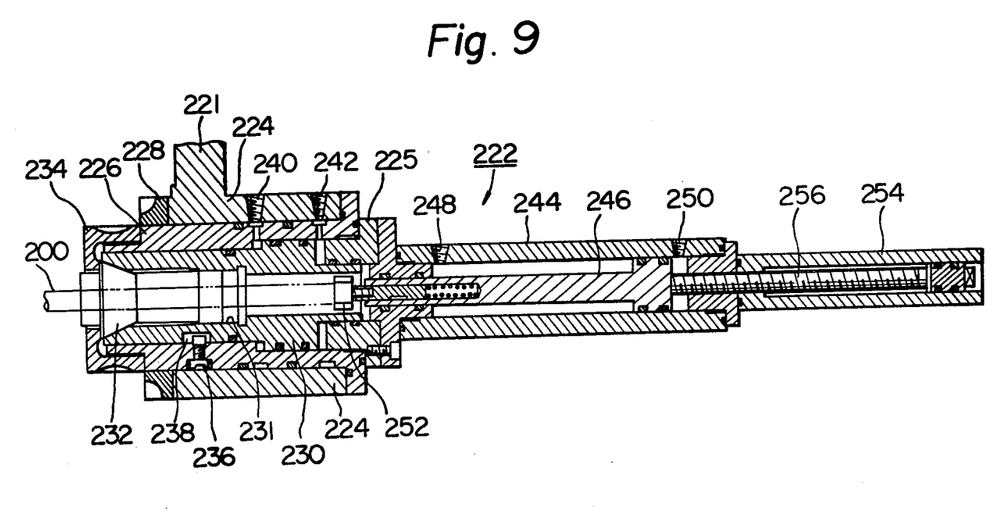
FIG. 9 is a longitudinal sectional view of part of the workpiece gripping fixture shown in FIG. 7.

FIGS. 7, 8 and 9 show the secondary workpiece gripping fixture 42 provided on opposing side of the headstock 16 for secondary machining of a workpiece 200 parted from a bar of stock gripped by the collet 26 which comprises a horizontal shaft 202 extending through the column 32 in parallel to the axis of the spindle 24. The shaft 202 is slidably supported at its forward end portion by a bracket 206 fixed to the column 32. The shaft 202 is further slidably supported at its rearward end portion by a journal bearing 203 supported by a bracket 204 fixed to the headstock 26. The shaft 202 is thus slidable along an axis parallel to the axis of the spindle 24. A hydraulic actuator or cylinder 208 mounted on the bed 12 has a plunger or rod 210, which is connected to the left end (in FIG. 7) of the shaft 202 to adjust the axial position of the shaft 202. Another hydraulic cylinder 212 mounted on the bracket 204 has a piston or plunger 214 arranged perpendicular to the shaft 202. In operation, when the cylinder 212 is not actuated, the shaft 202 is slidable either leftward or rightward by the plunger 210 of the hydraulic cylinder 208 independent of the headstock 16. On the contrary, when the hydraulic cylinder 212 is operated while the cylinder 208 is not actuated, the plunger 214 will be forced against the shaft 202 and effectively connect the shaft 202 to the bracket 204 and headstock 16 to allow longitudinal feeding of the shaft 202 by the numerically controlled servo motor 20 via the headstock 16.

The gripping unit 222 is shown in FIG. 9 as including a bored body 224 connected to the bracket 221. A cylinder or liner 226 is fixed within the body 224 by a nut 228 and closed at its right end by a cylinder head 225. A pressure piston 230 is slidably retained within the liner 226 and is formed with a bore 231 in which a collet 232 to hold the workpiece 200 is slidably retained. The left ends (in FIG. 9) of the piston 230 and collet 232 and internally and externally tapered respectively. A cap 234 is screwed onto the left end of the liner 226 to prevent the collet 232 from being pushed out from the left end of the liner 226. A pin 236 extends through the liner 226 to engage in a longitudinal groove in the piston 230 to prevent rotation of the piston 230. Ports 240 and 242 formed through the body 224 and liner 226 communicate with left and right faces of the piston 230 respectively. The axis of the collet 232 is coincident with the axis of the spindle 24.

A cylindrical extension 244 is fixed to the cylinder head 225 screwed onto the liner 226 fixed within the body 224. The extension 244 is formed with a bore in which a knockout piston or plunger 246 is longitudinally slidable. Ports 248 and 250 communicate with left and right faces of the piston 246, respectively. The left end of the piston 246 sealingly extends into the bore of the piston 230 in the liner 226 and terminates in an abutment member or stop 252. An extension 254 is fixed to the extension 244 and has a threaded bore through which an adjusting bolt 256 screwably extends. The left end of the adjusting bolt 256 extends into the extension 244 and is adapted for abutment by the right end of the piston 246 to adjustably limit the rightward travel thereof so that the stop 252 fixed to the left end of the piston 246 abuts against the right face of the workpiece 200 at an adjusted position to cause the workpieces 200 to be clamped at the same position. The lathe constructed as described above is operable in the following manner.

For turning operations, the clutch 58 is engaged so that the motor 48 drives the spindle 24 for rotation through the belt 56, pulley 54, shaft 50, pulley 52 and belt 60. Longitudinal feeding is provided by actuating the numerically controlled servo motor 20 which moves the headstock 16 left or right (as viewed in FIG. 1) through the reduction gear set 22 and lead screw 18. Since the pulley 52 is splined to the shaft 50, the pulley 52 and belt 60 will move leftward and rightward along with the headstock 16 and still drivingly connect the shaft 50 to the spindle 24.

To select the desired cutting tool, a source of pressurized fluid such as hydraulic oil is connected to the chamber 108 of the saddle 36 so that the fluid urges the piston 106, shaft 100 and turret 38 rightward as viewed in FIG. 4 so that the coupling 102 disengages from the coupling 104. The motor 112 is then energized to rotate the shaft 114, gear 116, gear 120, shaft 118, gear 122, gear 124 and thereby the turret 38 until the desired tool is oriented downward facing the workpiece. The limit switches 152 indicate the indexing positions of the turret 38. When the respective limit switch 152 is opened or closed indicating that the turret 38 has rotated to the position in which the desired tool is in the operative position, the motor 112 is de-energized. The chamber 108 is then connected to a drain (not shown) and pressurized fluid is introduced into the chamber 110 to move the piston 106, shaft 100 and turret 38 leftward as viewed in FIG. 4 so that the coupling 102 will engage with the coupling 104 to hold the turret 38 in the desired position.

For a turning operation, the clutch 68 is disengaged so that shafts 72 and 75 will not rotate and thereby the shafts 134 and 136 of the turret 38 will not rotate. The servo motor 44 is then numerically actuated by the numerical control system 21 to move the saddle 36 and thereby the turret 38 and the desired tool vertically in conjunction with the longitudinal feed provided by actuating the servo motor 20 to longitudinally move the headstock 16. The vertical movement of the turret 38 provides transverse or cross feed. Since the servo motors 20 and 44 are independently numerically controlled, any form may be cut on the face or circumference of the workpiece which extends to the right of the workpiece support 28. Whereas in a basic lathe in which the longitudinal and transverse feeds are provided by feed gears driven by a motor and the cutting profile is limited to the available feed gear ratios, in the present lathe there is no such limitation and any form may be cut.

It will be noticed that chips and oil discharged from the workpiece during machining fall into the container 46, and do not come anywhere near the guideways 14 for the headstock 16 or the guideways 34 for the saddle 36. Furthermore, the chips and oil do not come anywhere near the servo motors 20 and 44.

For operations such as keyway cutting and other forms of end milling, an end mill may replace the drill 142 shown in FIG. 4. In this case, the clutch 58 is disengaged so that the spindle 24 will not rotate. The clutch 68 is engaged so that the shafts 134 and 136 will be rotated by the motor 48 through the belt 66, pulley 64, shaft 62, belt 76, pulley 74, shafts 72 and 75 and gears 128, 130 and 132. The servo motor 44 is energized to move the saddle 36 downward so that the end mill cuts into the workpiece. The depth of the cut is determined by the height of the saddle 36. A longitudinal keyway, for example, may be cut by energizing the servo motor 20 to move the headstock 16 and thereby the workpiece longitudinally relative to the end mill.

For a radial drilling operation using, for example, the drill 142, the servo motor 20 is not energized so that the headstock 16 remains stationary. The radial drilling is performed by energizing the servo motor 44 to move the saddle 36, turret 38 and thereby the drill 142 vertically downward into the workpiece.

Although not shown, an indexing device of the spindle 24 which includes, for example, an angular sensor and a hydraulic clamp means, may be provided which allows angular indexing of the spindle 24 for drilling circumferentially spaced radial holes, milling or other similar operations. The indexing device may be controlled by an electric control unit of any known construction. In another form, the indexing device may include a servo motor adapted to be controlled by the numerical control system.

The operation of the secondary workpiece gripping fixture 42 will now be described with reference to FIGS. 7 to 9 of the drawings.

The tools mounted on the turret 38 are adapted to cut a portion of a workpiece which extends to the right of the workpiece support 28 as viewed in FIG. 7. To perform a secondary machining operation on the left portion of the workpiece 200 parted from a piece of stock held by the collet 26, the cylinder 208 is actuated to move the shaft 202 and also the gripping unit 222 leftward (in FIG. 7) until the stop 252 abuts against the right face of the workpiece 200. In this case, pressurized fluid is applied into the port 248 to move the piston 246 and thereby the stop 252 to a rightmost position in which the right end of the piston 246 abuts against the left end of the adjusting bolt 256.

In this condition, pressurized fluid is introduced through the port 240 to move the piston 230 rightward to disengage from the collet 232. The collet 232 is thereby allowed to expand so that the workpiece 200 may enter therethrough until the right face of the workpiece 200 will abut against the stop 252. The spindle 24 is rotated while a cut-off tool (not shown) is fed into the workpiece 200 to part it from the stock held by the collet 26.

When the parting operation is completed, the rotation of the spindle 24 is stopped and the port 240 is connected to the drain and the port 242 is connected to the pressurized fluid source to move the piston 230 leftward. The internal tapered surface of the piston 230 engages with the external tapered surface of the collet 232 to compress the collet 232 and firmly grip the workpiece 200. The cylinder 212 is then actuated to operatively connect the shaft 202 to the bracket 204 and thereby to the headstock 16. The cylinder 208 is then deactuated.

The numerically controlled servo motor 20 may be energized to longitudinally feed the headstock 16 and thereby the gripping unit 222. The numerically controlled servo motor 44 may be energized to vertically feed the turret 38. Any secondary machining operation may be preformed on the workpiece 200 which does not require rotation thereof.

To knock the workpiece 200 out of the gripping unit 222, the port 242 is connected to the drain and pressurized fluid is introduced into the port 240 to move the piston 230 rightward which allows the collet 232 to expand and release the workpiece 200. The port 248 is connected to the drain and pressurized fluid is introduced into the port 250 to move the piston 246 leftward (in FIG. 9) so that the stop 252 forces or knocks the workpiece 200 leftward out of the gripping unit 222.

Although in FIG. 4, the tool grip 138 is shown as rigidly holding a tool 140, the tool grip 138 may be replaced by a tool grip comprising a right angle drive (not shown) so that a tool such as a drill or mill may be rotated about a horizontal axis which is parallel to and coincides with the axis of the spindle 24. In this manner, drilling or similar operations may be performed either on the right face of a workpiece held by the collet 26 or the left face of a workpiece held by the gripping unit 222.

It will now be appreciated from the foregoing description that a lathe of the present invention has a turret which is arranged to be vertically movable above cutting areas of workpiece whereby the turret effectively resists reaction torgue in turning and secondary machinings such as drilling, recessing, keyway cutting and other similar operations on workpieces having a larger length to diameter ratio. The present invention thus precludes various shortcomings inherent in prior art compound lathes in which the turret is mounted in opposed position of the headstock. A variety of other advantages of the present invention will be summarized as follows:

(1) Since the turret is provided with only transverse feed means, a simple drive train can be provided between the turret and a source of driving power. Since, in addition, the turret is rotatably mounted on a saddle which is vertically movable above the headstock and a spindle of the headstock and a driving shaft for tools are arranged to be parallel to each other, it is capable to readily employ a common driving power source and integrate drive trains for the spindle and driving shaft.

(2) Due to inherent arrangement of the saddle with respect to the headstock, it is easy to enlarge the size of the saddle for thereby accommodating therein indexing means for the turret and driving mechanism for tools. Such an increase in the size of the saddle does not provide any deterrents to the reduction in overall size of the lathe so that the lathe can be manufactured in simple and compact construction which requires less mounting or installation spacing. This is because of the fact that the saddle is located on the same side as the headstock with respect to the cutting areas of the workpieces and vertically movable along a path within a spacing between strokes of the headstock.

(3) Since the headstock is provided with longitudinal feed means and the turret is provided with only transverse feed means, not only a numerical control system of an automatic compound lathe can be manufactured in simple arrangement but also the drive trains for tools on the turret can be simplified. Thus, the numerically controlled compound lathe can be considerably simplified to reduce manufacturing and maintenance cost.

(4) The lathe is equipped with a workpiece steady rest which supports the workpiece, it is possible to perform turning at high precision even though the lathe is of the type in which the headstock is horizontally movable.

(5) Since the saddle is located at the same side as the headstock with respect to the cutting areas of the workpiece and the turret is movable along the vertical path above the cutting areas of the workpiece, discharging efficiency of the chips and cutting oil can be considerably increased. This will prove particularly advantageous in an automatic compound lathe having various electrical components such as limit switches and other control units. Due to inherent arrangement of the saddle with respect to the headstock, the electrical components can be placed anywhere sufficiently spaced from the cutting areas of the workpiece and suitable for inspection and maintenance. Thus, the chips and cutting oil will not contact the electrical components so that the malfunction of the same can be satisfactorily prevented. In addition, an oil-proofed structure need not be provided to the cover for the saddle which accomodates electrical control units. Since, moreover, structural parts are not provided in front of the cover for the saddle, the cover can be readily removed from the saddle for servicing which reduces maintenance time.

(6) No structural parts are provided in front of the headstock and cutting areas of the workpieces, resulting in high operating efficency and improved maneuverability of machine elements.

(7) Specific arrangement of the saddle relative to the headstock reduces the spacing for installation of the lathe and permits the design of a bed providing less installation spacing.

(8) A secondary workpiece gripping device is arranged to be movable with the headstock and associated with a numerically control feed means for the headstock. Accordingly, the longitudinal feed of the secondary workpiece gripping device is numerically controlled in highly accurate manner without the provision of additional numerically controlled drive means. Thus, it is possible to minimize the load on the numerical control system and simplify the construction and arrangement of the system.

While a preferred embodiment of the present invention has been shown and described in detail, it is to be noted that the present invention is not limited thereto. Various modification and changes may also be made in the design and arrangements of the parts without departing from the scope of the present invention.

What is claimed is:

1. A lathe comprising a bed having horizontally disposed first guideways, a heastock horizontally slidable on said first guideways, a spindle rotatable in said headstock and having workpiece gripping means provided at a forward end portion of said spindle to grip a workpiece, a workpiece support detachable mounted on said bed in a coaxial relationship with said spindle at a position adjacent a forward end portion of said first guideways, a vertically extending column fixed to said bed at one adjacent side of said first guideways and at the same side as said headstock with respect to a plane perpendicular to the axis of said spindle and passing through a forward end of said workpiece support, second guideways provided on said column substantially vertically extending in a plane parallel to the axis of said spindle at a position adjacent a forward end portion of said first guideways, a saddle located at the same side as said headstock with respect to said plane passing through said forward end of said workpiece support and slidable on said second guideways to be vertically movable along a path overlying the slidable path of said headstock, a turret rotatably supported by said saddle and vertically movable therewith along a path which is perpendicular to the axis of said spindle, first driving means numerically controlled for horizontally feeding said headstock along said first guideways, second driving means numerically controlled for vertically moving said saddle along said second guideways and thereby moving said turret along said path which is perpendicular to the axis of said spindle, third driving means for rotating said spindle, and indexing means for rotating said turret to an indexed position, said turret including a hollow shaft horizontally extending through said saddle and drivingly connected to said indexing means for rotating said turret, a rotatable shaft extending through said hollow shaft, a plurality of tool gripping means mounted on said turret and drivably connected to said rotatable shaft, a drive train connected between said rotatable shaft and said third driving means to drive at least one of said tool gripping means, first coupling means disposed between said third driving means and said spindle, second coupling means disposed between said third driving means and said rotatable shaft, and said indexing means including a horizontally extending shaft having an axis parallel to said hollow shaft and rotatably supported by said saddle, gear means drivably connecting said horizontally extending shaft to said hollow shaft, and a motor mounted on said saddle and connected to said horizontally extending shaft to rotate said turret for indexing.

2. A lathe according to claim 1, in which said drive train comprises endless means connected between said second coupling means and said rotatable shaft to provide a drive connection therebetween, and tensioning means for applying a tension to said endless means.

3. A lathe according to claim 1, further comprising means for rotating said workpiece engaging member together with said spindle, said rotating means including a shaft longitudinally extending through said headstock in parallel to the axis of said spindle and rotatably supported by said workpiece support, first gear rotatable with said spindle in a unitary manner, a second gear rotatable with said longitudinally extending shaft and meshing with said first gear, a third gear mounted for rotation with said longitudinally extending shaft, and a fourth gear mounted on said workpiece engaging member for rotation therewith and meshing with said third gear.

4. A lathe according to claim 1, further comprising a secondary workpiece gripping means opposedly facing said workpiece gripping means of said spindle and movable along the axis of said spindle, and means for releasably connecting said secondary workpiece gripping means to said headstock.

5. A lathe according to claim 4, further comprising means for axially moving said secondary workpiece gripping means to a predetermined position.

6. A lathe according to claim 5, in which said secondary workpiece gripping means is horizontally moved by said first driving means when said horizontal shaft is coupled to said headstock by said connecting means.

7. A lathe according to claim 4, further comprising a horizontal shaft connected to said secondary workpiece gripping means and slidably supported by said column.

8. A lathe according to claim 4, in which said secondary workpiece gripping means comprises a collet and actuating means for moving said collet into operative engagement with said workpiece.

9. A lathe according to claim 8, in which said actuating means comprises a fluid actuated cylinder having its piston rod in axial alignment with said collet.

10. A lathe according to claim 9, in which said secondary workpiece gripping means further comprises workpiece nockout means having a stop engageable with one end of said workpiece.

11. A lathe according to claim 10, in which said secondary workpiece gripping means further comprises means for adjusting the position of said stop to adjustably limit the axial movement of said workpiece.

12. A lathe comprising a bed having horizontally disposed first guideways, a headstock horizontally slidable on said first guideways, a spindle rotatable in said headstock and having workpiece gripping means provided at a forward end portion of said spindle to grip a workpiece, a workpiece support detachably mounted on said bed in a coaxial relationship with said spindle at a position adjacent a forward end portion of said first guideways, a vertically extending column fixed to said bed at one adjacent side of said first guideways at the same side as said headstock with respect to a plane perpendicular to the axis of said spindle and passing through said forward end of said workpiece support, second guideways provided on said column substantially vertically extending in a plane parallel to the axis of said spindle at a position adjacent a forward end portion of said first guideways, a saddle located at the same side as said headstock with respect to said plane passing through said forward end of said workpiece support and slidable on said second guidways to be vertically movable along a path overlying the slidable path of said headstock, a turret rotatably supported by said saddle and vertically movable therewith along a path which is perpendicular to the axis of said spindle, said turret including rotatable tool gripping means, a hollow shaft extending through said saddle and connected to said turret, a rotatable shaft horizontally extending through said hollow shaft and operatively connected to said rotatable tool gripping means to rotate the same, indexing means drivingly connected to said hollow shaft for rotating said turret to an indexed position, and a source of driving power operatively connected to said spindle and said rotatable shaft to provide a driving power thereto, said indexing means including a horizontally extending shaft having an axis parallel to said hollow shaft and rotatably supported by said saddle, gear means drivably connecting said horizontally extending shaft to said hollow shaft, and a motor mounted on said saddle and connected to said horizontally extending shaft to rotate said turret for indexing.

13. A lathe comprising a bed having horizontally disposed first guideways, a headstock horizontally slidable on said first guideways, a spindle rotatable in said headstock and having workpiece gripping means provided at a forward end portion of said spindle to grip a workpiece, a workpiece support detachably mounted on said bed in a coaxial relationship with said spindle at a position adjacent a forward end portion of said first guideways, a vertically exending column fixed to said bed at one ajacent side of said first guideways at the same side as said headstock with respect to a plane perpendicular to the axis of said spindle and passing through a forward end of said workpiece support, second guideways provided on said column substantially vertically extending in a plane parallel to the axis of said spindle adjacent said forward end portion of said first guideways, a saddle located at the same side as said headstock with respect to said plane passing through said forward end of said workpiece support and slidable on said second guideways to be vertically movable along a path overlying the slidable path of said headstock, and a turret rotatably supported by said saddle and vertically movable therewith, said turret including rotatable tool gripping means, a hollow shaft extending through said saddle and connected to said turret, and a rotatable shaft extending through said hollow shaft and operatively connected to said tool gripping means.

14. A lathe comprising a bed having horizontally disposed first guideways, a headstock horizontally slidable on said first guideways, a spindle rotatable on said headstock and having workpiece gripping means provided at a forward end of said spindle to grip a workpiece, a workpiece support detachably mounted on said bed in coaxial relationship with said spindle at a position adjacent a forward end portion of said first guideways, a vertically extending column fixed to said bed at one adjacent side of said first guideways at the same side as said headstock with respect to a plane perpendicular to the axis of said spindle and passing through a forward end of said workpiece support, second guideways provided on a front face of said column and substantially vertically extending in a plane parallel to the axis of said spindle, a saddle located at the same side as said headstock with respect to said plane passing through said forward end of said workpiece support and slidable on said second guideways to be vertically movable along a path overlying the slidable path of said headstock, a turret rotatably supported by said saddle and vertically movable therewith, secondary workpiece gripping means opposedly facing said workpiece gripping means of said spindle, and means for releasably connecting said secondary workpiece gripping means to said headstock, said turret including rotatable tool gripping means, a hollow shaft extending through said saddle and connected to said turret, and a rotatable shaft extending through said hollow shaft and operatively connected to said tool gripping means.

15. A lathe comprising a bed having a horizontally disposed first guideways, a headstock horizontally slidable on said first guideways, a workpiece gripping spindle rotatable in said headstock, a vertically extending column fixed to said bed at one adjacent side of said first guideways at the same side as said headstock with respect to a plane perpendicular to the axis of said spindle and passing through a forward end portion of said bed, second guideways provided on said column substantially vertically extending in a plane parallel to the axis of said spindle at a position adjacent a forward end portion of said first guideways, a saddle located at the same side as said headstock with respect to said plane passing through said forward end of said bed and slidable on said second guideways to be vertically movable along a path overlying the slidable path of said headstock, a turret rotatable supported by said saddle and vertically movable therewith, said turret comprising rotatable tool gripping means, rotatable shaft means extending through said saddle to said turret and operatively connected to said tool gripping means, said rotatable shaft means being rotatable about an axis parallel to the axis of rotation of said spindle, a drive motor having its drive shaft axis parallel to the axes of said rotatable shaft means and said spindle, and drive means drivingly and selectively interconnecting said motor drive shaft with said rotatable shaft means and said spindle.

16. A lathe according to claim 15 wherein said drive means comprises a rotatable member rotatable about a fixed shaft, said fixed shaft having an axis parallel to the axis of said spindle, said drive comprising an endless member passing between said rotatable member and spindle to drive the latter, said rotatable member being longitudinally slidable along said fixed shaft as said headstock slides on said first guideways.

17. A lathe according to claim 14 wherein said drive means comprises endless means interconnected between said motor drive shaft and said rotatable shaft means, said drive means further comprising tension regulating means for automatically regulating the tension of said endless means as said saddle and the rotatable shaft means carried therewith are vertically movable along said second guideways.

* * * * *